Dec. 27, 1927.
F. L. SCOTT
1,653,734
GAUGE COCK
Filed June 1, 1926
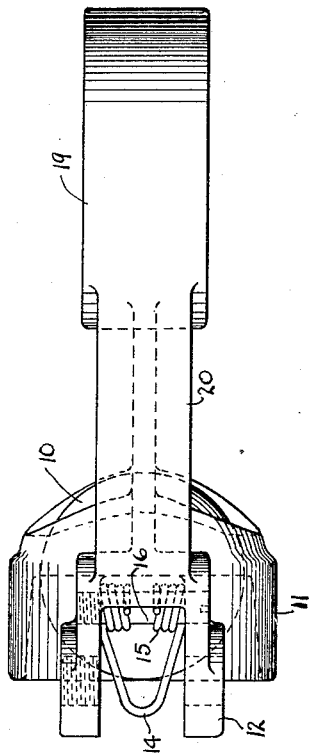
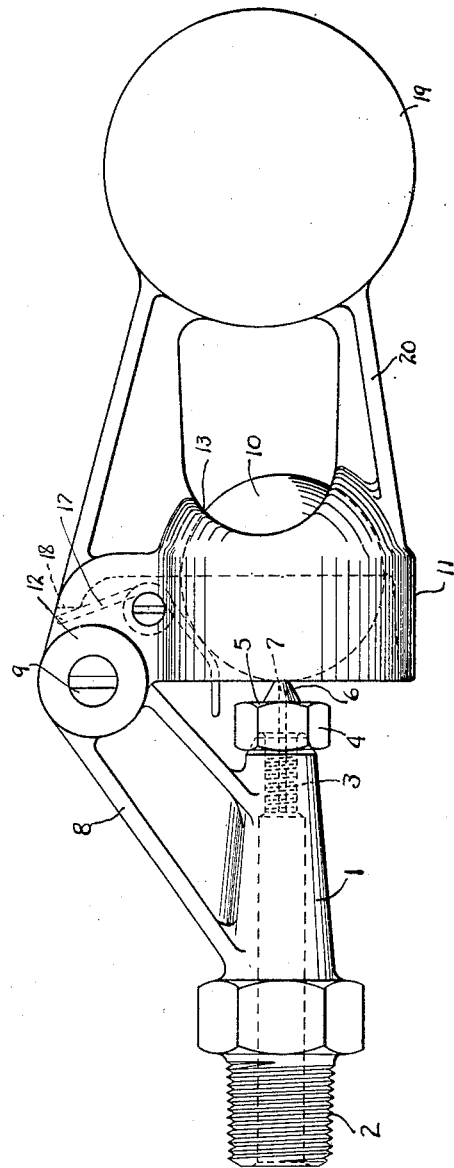
FLOYD L. SCOTT, INVENTOR.
BY Jesse P. Stone
ATTORNEY.

Patented Dec. 27, 1927.

1,653,734

UNITED STATES PATENT OFFICE.

FLOYD L. SCOTT, OF HOUSTON, TEXAS.

GAUGE COCK.

Application filed June 1, 1926. Serial No. 112,818.

My invention relates to gauge cocks to be used on steam boilers in determining the water level in the boiler.

It is common in steam boilers, even in those boilers in which a glass gauge is used to determine the level of the water in the boiler, to also employ a gauge cock or a plurality of gauge cocks arranged in a convenient place on the front of the boiler and at different levels to determine by test at what level the water stands in the boiler. Such a gauge cock usually has an open end, closed by a valve, and means have been devised for renewing the seat of the valve which closes the end of the cock, and as the seat must be renewed and changed frequently, it is desirable to provide a valve closure for the open end of the gauge which may be renewed quickly and without unnecessary manipulation.

It is an object of the invention to provide a gauge cock having a valve closing the end thereof, said valve being easily changed to renew the seat, and which provides a maximum surface thereon for renewing the contact face which closes the passage.

It is also desired to so shape and mount the valve that the steam issuing from the nozzle of the gauge may be deflected into a cup and thus prevent its being spread laterally so as to injure the operator.

It is also a further object to so mount the valve that it may be removed from its seat and replaced by another valve entirely and without unnecessary manipulation.

It is also an object to so pivot the valve at the end of the gauge that it may swing in a direction approximately axially of the gauge member and thereby obtain a more efficient and firm closure of the gauge.

Referring to the drawing herewith, Fig. 1 is a side elevation of a gauge cock constructed to carry out my invention. Fig. 2 is a side elevation at right angles to the view shown in Fig. 1, illustrating the valve member as removed from its connection with the gauge. Like numerals of reference refer to like parts in both the views.

In the drawing, the gauge cock is shown as detached from the boiler and as gauge cocks of this general character are common in the art, it is believed that the invention will be clearly understood through reference to the drawings, wherein the gauge member 1 is shown as being threaded at its inner end 2 for screwing within the usual openings provided in the boiler to receive them. The gauge member is tubular in shape having its forward end threaded, as shown in dotted lines at 3, to receive the inner threaded end of the nozzle 4.

The nozzle 4 is reduced in diameter and threaded externally to screw within the opening 3 in the cock and has an enlarged portion 5 adjacent the outer end which is made polygonal to receive a wrench. The forward end of the nozzle is provided with a tapered end 6 and a constricted passage, indicated in dotted lines at 7, which extends longitudinally through the nozzle and issues from the end 6. It will be noted that the forward end of the nozzle at 6 is flattened off to provide a seat for the valve member.

As a support for the valve member, a laterally inclined arm 8 is formed upon the body 1 of the gauge cock, said arm terminating at a point contemplated as being set vertically above the point of the nozzle 6. It has therein an opening to receive a pivot pin 9 by means of which the valve member is hinged to the arm at its forward end.

The valve member comprises a sphere or ball 10 housed loosely within a cup 11. Said cup is cylindrical at its end facing the nozzle, but on the side away from said nozzle its walls converge so as to restrict the movement of the ball away from the open side. There is provided an opening 13 through which the outer face of the ball may project, allowing the ball to be moved in its seat in the cup. On the upper side of the cup a pair of lugs or arms 12 are formed adapted to straddle the outer end of the arm 8, said lugs being formed with an opening therethrough to receive the pin 9 on which the cup is pivotally supported.

The ball 10 is held in its position within the cup 11 by means of a spring member 14. I have shown this spring as formed with an inner spiral coil 15 on each of its arms, said coil surrounding a pin 16 extending through the spaced lugs 12. The ends of the spring are extended laterally, as shown at 17 in dotted lines in Fig. 1, said ends bearing against a shoulder 18 on the projecting lugs 12. The forward arm 14 is held resiliently against the ball 10, as shown in the drawing. The forward end of the arm being bent away from the ball so that it may be manipulated to release the ball in an obvious manner.

A weight 19 is provided at the outer end of the cup, said weight being connected with the cup by two opposite arms 20, as shown best in Fig. 1, the space between the arms allowing access to the ball 10 so that it may be rotated or shifted to bring different areas on the ball into position to contact with the end of the nozzle 6.

It will be noted that the ball forming the valve which closes the open end of the gauge cock nozzle 4 will be held by gravity directly against the open end of the gauge, and the ball being spherical the surface will fit the opening formed at the end of the nozzle and close the same positively, and it will be observed that the movement of the ball valve into its seat will be in the direction which is approximately axial to the center line of the gauge. The making of the ball spherical also allows a maximum surface which may be presented as required in a position to close the mouth of the gauge. One ball will, therefore, last for a long time without the necessity of renewing the ball. When it becomes necessary, however, to renew the ball, the valve may be swung up on its pivot 19 so that access may be obtained to the open mouth of the cup 11 and the ball readily removed and a new one substituted.

The mounting of the ball within the cup 11, as shown in Fig. 1, provides a rim formed by the walls of the cup 11 around the ball so that when steam may issue from the nozzle of the gauge, it will be deflected by the spherical surface of the ball laterally and inwardly into the bottom of the cup and will then be thrown backwardly against the boiler. There will be, therefore, no danger of the operator being burned by the escaping steam.

The further objects and advantages of the invention will be apparent to one skilled in the art.

What I claim as new and desire to protect by Letters Patent is:

1. A gauge cock comprising a tubular body having an outer constricted orifice, a valve cup pivoted to swing to and from said orifice, a ball valve in said cup, resilient means to hold said ball adjustably in said cup, and means to hold said valve against said orifice.

2. A gauge cock comprising a tubular body having an outer constricted orifice, a valve cup pivoted to swing to and from said orifice, a ball valve in said cup, resilient means to hold said ball adjustably in said cup, and a weight to force said cup and valve in the axial direction of said orifice.

3. A gauge cock for boilers comprising a tubular outwardly projecting body having a tapered forward end with a constricted orifice therein, a supporting arm spaced above said orifice, a cup pivoted on said arm and held by gravity toward said orifice, a ball of comparatively soft metal in said cup, and a spring holding said ball resiliently within said cup, said ball adapted to bear against said orifice and removable with said cup therefrom.

4. A gauge cock having an outer tapered end free of lateral obstructions, said end having a constricted orifice therein, a ball cup pivoted at a point spaced above said orifice, and a soft metal ball of large size compared with said orifice, resilient means to hold said ball adjustably in said cup, said cup and ball being held by gravity against said orifice.

In testimony whereof I hereunto affix my signature this 27th day of May A. D. 1926.

FLOYD L. SCOTT.